No. 823,444. PATENTED JUNE 12, 1906.
B. F. SASSAMAN.
MEASURING INSTRUMENT.
APPLICATION FILED MAY 1, 1905.
3 SHEETS—SHEET 1.
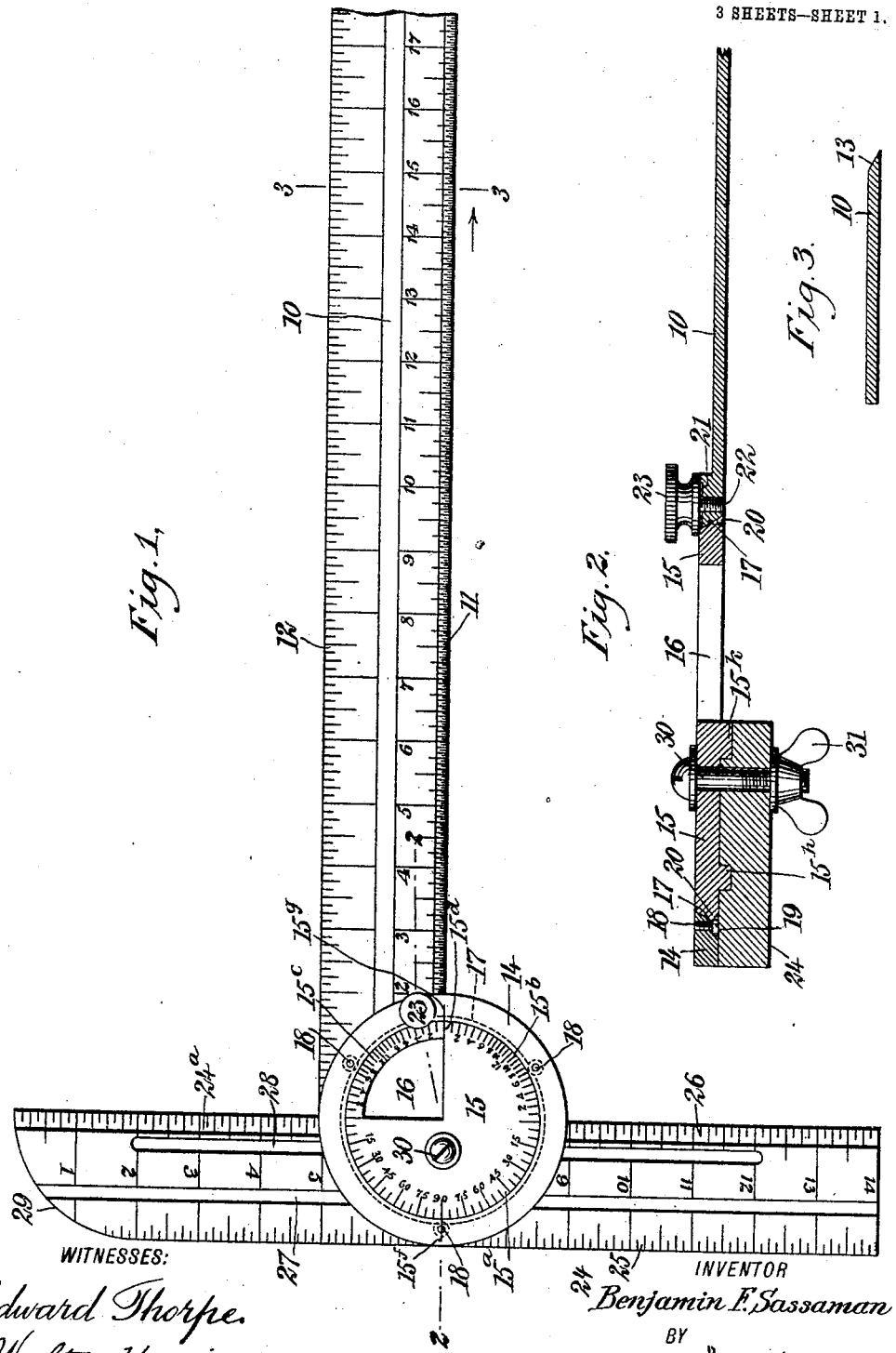
WITNESSES:
Edward Thorpe.
Walton Harrison
INVENTOR
Benjamin F. Sassaman
BY
ATTORNEYS No. 823,444. PATENTED JUNE 12, 1906.
B. F. SASSAMAN.
MEASURING INSTRUMENT.
APPLICATION FILED MAY 1, 1905.
3 SHEETS—SHEET 2.
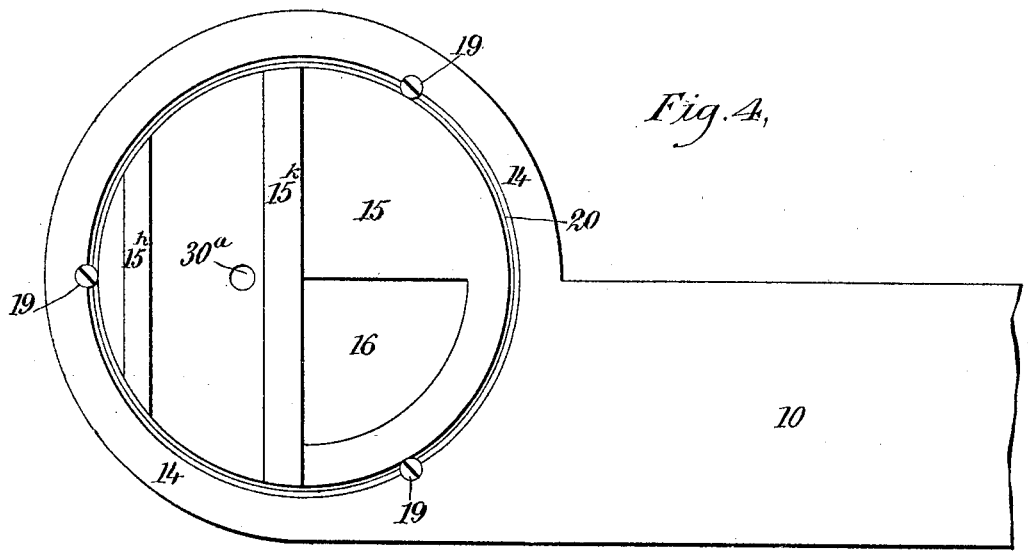
Fig. 4,
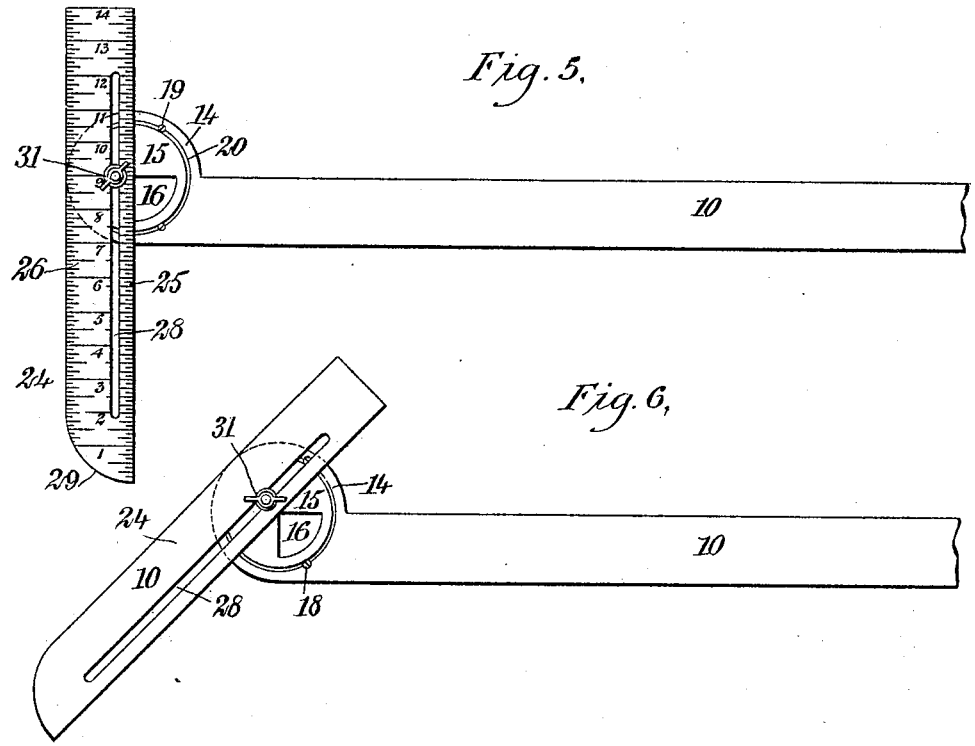
Fig. 5,
Fig. 6,
WITNESSES:
Edward Thorpe,
Walton Harrison
INVENTOR
Benjamin F. Sassaman
BY
ATTORNEYS No. 823,444. PATENTED JUNE 12, 1906.
B. F. SASSAMAN.
MEASURING INSTRUMENT.
APPLICATION FILED MAY 1, 1905.
3 SHEETS—SHEET 3.
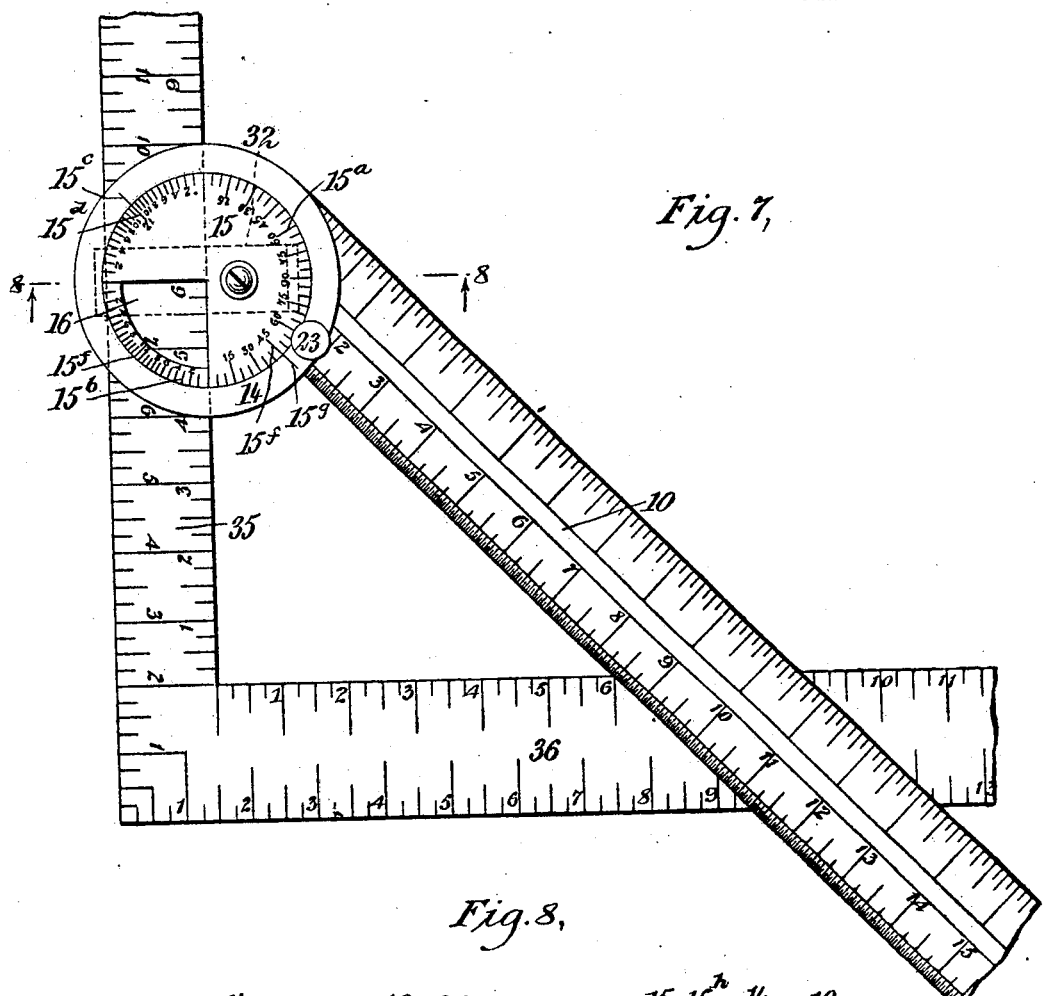
Fig. 7,
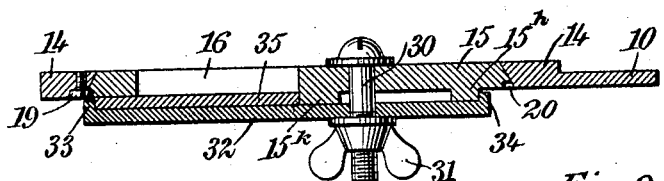
Fig. 8,
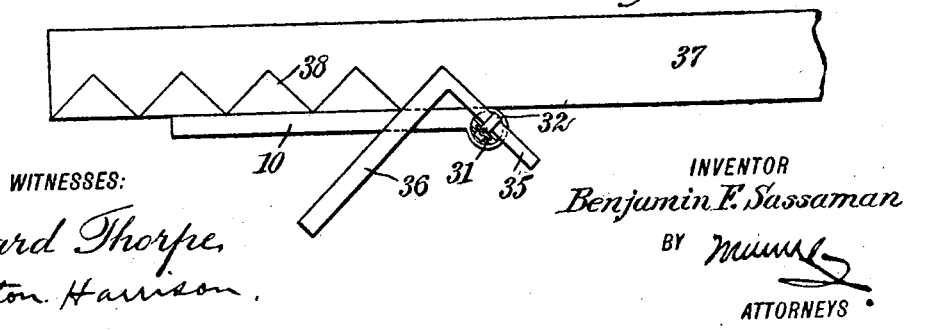
Fig. 9.
WITNESSES:
Edward Thorpe,
Walton Harrison.
INVENTOR
Benjamin F. Sassaman
BY
ATTORNEYS

UNITED STATES PATENT OFFICE.

BENJAMIN F. SASSAMAN, OF GIBBSTOWN, NEW JERSEY.

MEASURING INSTRUMENT.

No. 823,444.      Specification of Letters Patent.      Patented June 12, 1906.

Application filed May 1, 1905. Serial No. 258,247.

*To all whom it may concern:*

Be it known that I, BENJAMIN F. SASSAMAN, a citizen of the United States, and a resident of Gibbstown, in the county of Gloucester and State of New Jersey, have invented a new and Improved Measuring Instrument, of which the following is a full, clear, and exact description.

My invention relates to measuring instruments, my more particular object being to produce a square containing movable parts and which may be used for a great variety of purposes.

Reference is to be had to the accompanying drawings, forming a part of this specification, in which similar characters of reference indicate corresponding parts in all the figures.

Figure 1 is a plan view of a square arranged for general use, as a so-called "T-square." Fig. 2 is an enlarged fragmentary section upon the line 2 2 of Fig. 1 looking toward the top of the figure and showing the arrangement whereby certain parts are rendered movable relatively to each other. Fig. 3 is an enlarged cross-section through the blade 10 and taken upon the line 3 3 of Fig. 2 looking in the direction of the arrow. Fig. 4 is an enlarged inverted plan view of the blade and circular plate removed from the head. Fig. 5 is a similar view showing the instrument used as an ordinary depth-gage. Fig. 6 shows the instrument arranged for use as a depth-gage when the part to be measured lies at an angle to the blade 10. Fig. 7 shows the blade 10 and its mountings connected with an ordinary steel square and used for purposes of a "fence." Fig. 8 is an enlarged section through the same upon the line 8 8 of Fig. 7 looking in the direction of the arrow, and Fig. 9 shows the fence in use for marking the board 37.

The blade is shown at 10 and is provided with graduations 11 12, the graduations 11 being preferably quite fine and disposed upon a bevel-surface 13, as indicated in Figs. 1 and 3. The blade 10 is provided with a bearing-collar 14, connected rigidly therewith, and revolubly mounted within this collar is a circular plate 15, provided with an aperture 16, having the shape of a quarter-circle—that is, a general fan shape. The circular plate 15 is bounded by a beveled edge 17, which merges into an annular slot 20, this slot extending entirely around the circular plate. Secured within the bearing-collar 14 are screws 18, each provided with a slotted head 19, whereby it may be turned. The bearing-collar 14 is beveled internally, so as to fit the beveled edge 17 of the circle. The bearing-collar 14 is provided with a clearance-aperture 21 and with a revoluble screw 22, having a milled head 23, adapted to engage the surface of the circular plate 15 and of the bearing-collar 14, as indicated in Fig. 2. The head of the square is shown at 24 and is provided with oppositely-disposed graduations 25 26 and also provided with grooves $24^a$ 27, as indicated more particularly in Fig. 1. The head 24 is provided with a comparatively long slot 28 and is further provided with a rounded portion 29 of a conformity approximating the outer boundary of a quarter-circle. A pivot-pin 30 passes through the circular plate 15 and through the head 24 and is engaged by a thumb-nut 31, as indicated in Fig. 2. The circular plate 15 is provided with a number of equidistant graduations $15^a$, disposed, as shown, in the form of a semicircle and also with graduations $15^b$ $15^c$ of differential size, also in the form of a semicircle. The bearing-collar 14 is provided with an index-mark $15^g$, which may be brought into registry with somewhat similar marks $15^d$ $15^f$ upon the circular plate 15 or with any of the graduations upon said circular plate. The index-mark $15^g$ upon the bearing-collar 14 is in alinement with one edge of the blade 10, as will be understood from Figs. 1 and 7. The under side of the circular plate 15 is provided with tongues $15^h$ $15^k$, which are let into the grooves 27 $24^a$ of the head 24, as indicated in Fig. 2, and extend practically across the entire width of the circular plate, as indicated in Fig. 4, so as to secure the bearing-collar 14 in firm engagement with the head 24, thereby preventing relative movement therebetween.

The clamping-plate 32 is provided with upturned lugs 33 34 and is employed when it is desired to discard the head 24 and insert instead a head 35 of an ordinary square 36, as indicated in Fig. 7. The substitution of the ordinary square for the head 24 is made, for instance, where it is desirable to use them as a fence, as indicated in Fig. 9. The fence is a composite structure consisting of a square or the like and means for mounting the same, so as to hold the square at definite angles. To substitute the ordinary square for the head 24, the thumb-nut 31 is taken off, the head 24 is removed, the clamping-plate 32 is placed in position, as indicated by dotted lines in Fig. 7 and by full lines in Fig. 8, the lug 34, engaging the tongue 15ʰ, and the head 35 of the ordinary square is inserted intermediate of the lug 33 and the circular plate 15, after which the thumb-nut 31 is replaced upon the pivot-pin 30 and secured tightly into position, so as to clamp the head 35 of the square rigidly in position. At 37 is a board illustrating the use of the fence. Either side of the ordinary square may be seen by contrasting Figs. 7 and 9. The blade 10 is moved along the under side of the board 37, and the head 35 and the blade of the ordinary square locate the proper position for forming the line 38, which is made by the carpenter's pencil in the usual manner. The graduations 15ᵃ represent the degrees of the circle. Hence when the head 24 is stationary and the blade 10 is swung around to any desired angle the number of degrees is indicated by these graduations. The graduations upon the circular plate 15, taken together with the index-marks 15ᵍ upon the bearing-collar 14, together constitute a protractor, which may be employed in a diversity of purposes.

The operation of my device is as follows: If it be desired to employ the instrument as a T-square, the blade 10 is movable into the position indicated in Fig. 1. The operator being able to see through the aperture 16 can place a pencil-point directly against the edge of the head 24, and consequently can have no trouble in using the square for any purposes peculiar to a T-square. In this position the instrument can also be used as try-square, or the blade 10 can be moved relatively to the head 24, as desired. If the operator desires to determine the extent of a slant relatively to a vertical line, he places either edge of the head 24 against the line, and loosening the screw 23 he swings the blade 10 to the proper inclination and then turns the head 24. He then notes the numerals "2," "4," "6," "8," &c., which indicates the number of inches of slant to the foot vertically. For instance, the numeral "4" would mean that the line measured by the blade 10 inclines in a vertical space of one foot a distance of four inches. Similar arrangements may be made from a horizontal line by placing the head 24 against said line and again noting the measurement, but this time from the opposite end of the differential scale or group of graduations. As indicated in Fig. 5, the instrument is used as a depth-gage. The operator grasps the blade 10 and inserts a portion of the head 24 into the hole to be measured, noting the depth of the hole as indicated by the graduations. If, however, the hole lies at an angle relatively to the general length of the blade 10, the head 24 is inclined as indicated in Fig. 6 and then inserted into the hole, its hepth being noted, as above.

It is needless to relate the many uses and combination of uses to which my device is applicable, as these uses will readily suggest themselves to persons skilled in this art.

Having thus described my invention, I claim as new and desire to secure by Letters Patent—

1. A measuring instrument, comprising a blade having an annular bearing-collar provided with an index-mark, a circular plate rotatably mounted within the bearing-collar and provided with graduations, the plate having an angular aperture through which observations may be made, and downwardly-projecting lugs spaced apart and parallel with each other, a head having longitudinal grooves to receive the lugs, means for fixing the circular plate with respect to the head, and means for fixing the blade with respect to the circular plate.

2. A measuring instrument comprising a blade having an annular bearing-collar provided with an index-mark, a circular plate rotatably mounted within the bearing-collar and provided with graduations, the circular plate having an angular aperture through which observations may be made, and downwardly-projecting lugs spaced apart and parallel with each other, a head having longitudinal grooves to receive the lugs, means for fixing the circular plate with respect to the head, and a set-screw traversing the blade and having a head for engaging the circular plate.

3. A measuring instrument comprising a blade having an annular bearing-collar, a circular plate rotatably mounted within the bearing-collar, the circular plate having an aperture through which observations may be made, and downwardly-projecting lugs spaced apart and parallel with each other, a head having longitudinal grooves to receive the lugs, means for fixing the circular plate with respect to the blade, and means for fixing the head with respect to the circular plate.

4. A measuring instrument, comprising a blade having an annular bearing-collar, a circular plate rotatably mounted within the bearing-collar, the circular plate having downwardly-projecting lugs spaced apart and parallel with each other, a head having longitudinal grooves to receive the lugs, means for fixing the circular plate with respect to the blade, and means for fixing the head with respect to the circular plate.

In testimony whereof I have signed my name to this specification in the presence of two subscribing witnesses.

BENJAMIN F. SASSAMAN.

Witnesses:
 CHAS. P. MYERS,
 WILLIAM H. SHOEMAKER.